US007561650B2

United States Patent
Ryue et al.

(10) Patent No.: US 7,561,650 B2
(45) Date of Patent: Jul. 14, 2009

(54) METHOD AND APPARATUS FOR CORRECTING ASYMMETRIC WAVEFORM LEVEL IN CONSIDERATION OF ASYMMETRIC ERROR AFTER THE DECIMAL POINT

(75) Inventors: Eun-jin Ryue, Suwon-si (KR); Hyun-soo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 11/356,007

(22) Filed: Feb. 17, 2006

(65) Prior Publication Data

US 2006/0198258 A1 Sep. 7, 2006

(30) Foreign Application Priority Data

Feb. 18, 2005 (KR) ...................... 10-2005-0013559

(51) Int. Cl.
*H04L 7/00* (2006.01)
(52) U.S. Cl. ...................................... 375/371
(58) Field of Classification Search ................ 375/226, 375/371; 359/326; 369/59.26; 702/106; 360/25
See application file for complete search history.

(56) References Cited

U.S. PATENT DOCUMENTS

| 6,324,144 B1 * | 11/2001 | Won et al. ................. 369/59.15 |
| 6,426,926 B1 * | 7/2002 | Sonu ........................ 369/47.17 |
| 6,529,340 B2 * | 3/2003 | Gowda et al. .................. 360/25 |
| 6,980,773 B2 * | 12/2005 | Boman et al. .................. 455/73 |
| 7,225,096 B2 * | 5/2007 | Guevremont et al. ........ 702/106 |
| 7,342,864 B2 * | 3/2008 | Nagai et al. .............. 369/59.26 |
| 2002/0118438 A1 * | 8/2002 | Gowda et al. ............... 359/326 |
| 2002/0172112 A1 * | 11/2002 | Shoji et al. ............... 369/47.35 |

* cited by examiner

*Primary Examiner*—Kevin Y Kim
(74) *Attorney, Agent, or Firm*—Sughrue Mion, PLLC

(57) ABSTRACT

A method and an apparatus for correcting an asymmetric waveform level in consideration of an asymmetric error after the decimal point are disclosed. A zero-crossing detector for correcting an asymmetry signal detects a zero-crossing point and a decimal-point asymmetry detector calculates a jitter value required for correcting the asymmetry waveform level. A counted value decider decides a counted value using the zero-crossing point detected by the zero-crossing detector, the jitter value and sign bits of sample signals according to a system clock period. Values after the decimal point are reflected to a counter, and thus the asymmetry can be detected more accurately to improve the performance.

24 Claims, 9 Drawing Sheets

FIG. 4D

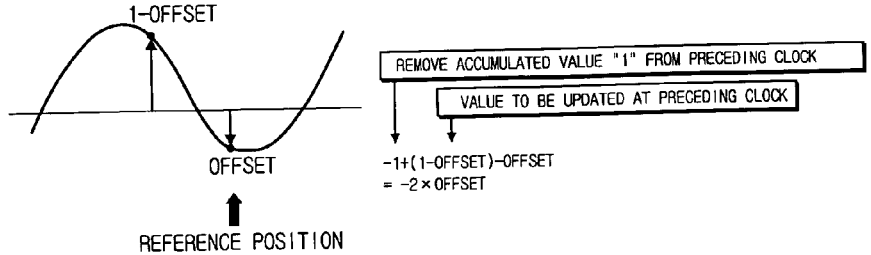

CASE (i) 111

REMOVE ACCUMULATED VALUE "1" FROM PRECEDING CLOCK
VALUE TO BE UPDATED AT PRECEDING CLOCK
−1+(1−OFFSET)−OFFSET
= −2×OFFSET

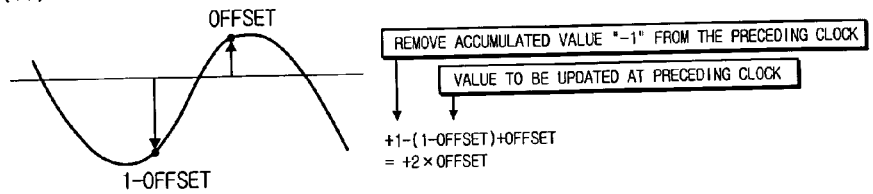

CASE (ii) 110

REMOVE ACCUMULATED VALUE "−1" FROM THE PRECEDING CLOCK
VALUE TO BE UPDATED AT PRECEDING CLOCK
+1−(1−OFFSET)+OFFSET
= +2×OFFSET

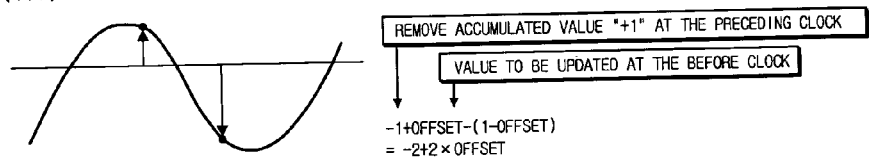

CASE (iii) 101

REMOVE ACCUMULATED VALUE "+1" AT THE PRECEDING CLOCK
VALUE TO BE UPDATED AT THE BEFORE CLOCK
−1+OFFSET−(1−OFFSET)
= −2+2×OFFSET

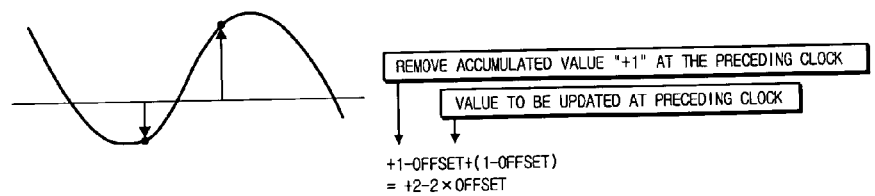

CASE (iv) 100

REMOVE ACCUMULATED VALUE "+1" AT THE PRECEDING CLOCK
VALUE TO BE UPDATED AT PRECEDING CLOCK
+1−OFFSET+(1−OFFSET)
= +2−2×OFFSET

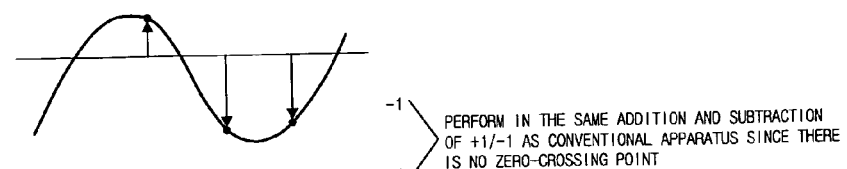

CASE (v) 0×1

−1
+1  PERFORM IN THE SAME ADDITION AND SUBTRACTION OF +1/−1 AS CONVENTIONAL APPARATUS SINCE THERE IS NO ZERO-CROSSING POINT

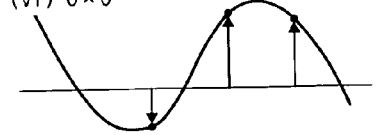

CASE (vi) 0×0

METHOD AND APPARATUS FOR CORRECTING ASYMMETRIC WAVEFORM LEVEL IN CONSIDERATION OF ASYMMETRIC ERROR AFTER THE DECIMAL POINT

This application claims priority from Korean Patent Application No. 10-2005-0013559, filed on Feb. 18, 2005, in the Korean Intellectual Property Office, the disclosure of which is incorporated herein by reference in its entirety.

BACKGROUND OF THE INVENTION

1. Field of the Invention

Apparatuses and methods consistent with the present invention relate to correcting an asymmetric waveform level, and more particularly to correcting an asymmetric waveform level in consideration of an asymmetric error after the decimal point.

2. Description of the Related Art

In an optical disc system including a compact disc (CD) and a digital versatile disc (DVD), an up-down symmetry of an RF signal, which is outputted from the disc, centering around a reference level is destroyed due to an error occurring in the manufacturing process of the disc. If such an asymmetric waveform is produced, it is difficult to find the center value of the waveform and this causes a restoration of data without error to become difficult.

Also, a defect in the RF signal may occur due to a defect in the optical disc such as scratch, user's fingerprint and dust on the surface of the optical disk. Thus, it is necessary to correct the above-described asymmetric waveform and defect.

FIG. 1 shows a circuit for detecting an asymmetric signal (e.g., DC-offset) using a digital sum value (DSV) algorithm. Referring to FIG. 1, the circuit for detecting and correcting an asymmetry of a reproduced signal during the reproduction of an optical disc has the construction that reads data from an optical disc by irradiating laser onto the surface of the disc and converting the strength of light reflected from the disc surface into an electric signal. The electric signal read out from the disc, which is called an RF signal, is converted into a binary signal and then is used for the desired purpose through a demodulation process. In manufacturing the optical disc, an upper waveform period of the RF signal around an intermediate level of the RF waveform may be different from a lower waveform period of the RF signal due to an error occurring in the disc manufacturing process. To correct this, a conventional DSV control system includes a corrector 100, a comparator 120 and a counter 140. The corrector 100 corrects the signal level of the error, and the comparator 120 decides the polarity (e.g., + or −) of specified threshold values.

FIG. 2 shows a principle of a counter operation in a DSV algorithm. The operation of the conventional asymmetric signal detection circuit will be explained with reference to FIGS. 1 and 2.

First, the asymmetric signal detection circuit decides and accumulates a first interpolated signal (i.e., average value of two sample signals) of analog-to-digital (A/D) converted sample signals as a polarity value. Then, the circuit operates a counter 140 to calculate the asymmetry of the signal using the accumulated value. The circuit also judges the polarity of the asymmetric signal and corrects the signal through an up-down correction whenever the continuously accumulated signal exceeds a predetermined threshold value, and then resets the counter 140.

The above-described correction using the DSV method can achieve a stable operation without being effected by an amount of asymmetric polarity and a timing error value. However, in the conventional DSV method, a phase locked loop (PLL) cannot properly operate if a 3T (T: sampling period) or 4T signal, which frequently occurs in a CD/DVD/BD system in which a frequency error occurs, appears successively. That is, the counter 140, which performs ± up/down operation by deciding the polarity with reference to a sign, becomes unable to perform a fine asymmetric estimation, and this causes the PLL to be unable to operate properly, thereby making data restoration impossible.

SUMMARY OF THE INVENTION

The present invention has been developed in order to solve the above and other problems associated with the conventional arrangement. An aspect of the present invention is to provide a method and an apparatus for correcting an asymmetry waveform level in consideration of an asymmetric error after the decimal point.

In order to achieve the above-described aspect of the present invention, there is provided a method for correcting an asymmetry waveform level in consideration of an asymmetric error after the decimal point, which comprises the steps of a zero-crossing detector that corrects an asymmetry signal detecting a zero-crossing point; a decimal-point asymmetry detector calculating a jitter value required for correcting the asymmetry waveform level; and a counted value decider deciding a counted value using the zero-crossing point detected by the zero-crossing detector, the jitter value and sign bits of sample signals according to a system clock period.

The step of detecting the zero-crossing point through the zero-crossing point detector may detect the zero-crossing point by comparing the signs of the two successive sample signals. Also, the jitter value is obtained by the following equation:

$$b' = b \times \text{system clock}/(a+b)$$

where, "b'" denotes the jitter value, "a" denotes a larger value out of values of sample signals before and after the zero-crossing point, and "b" denotes a smaller value out of the values of the sample signals before and after the zero-crossing point.

Also, if the zero-crossing point exists between the sample signals, the value of the sample signal before the zero-crossing point is larger than the value of the sample signal after the zero-crossing point, and the sign of the sample signal after the zero-crossing point is negative, the counted value is calculated by the following equation:

Counted Value = −1+(1−offset)−offset = −2×offset where "offset" means an amount of asymmetry after the decimal point.

Also, if the zero-crossing point exists between the sample signals, the value of the sample signal before the zero-crossing point is larger than the value of the sample signal after the zero-crossing point, and the sign of the sample signal after the zero-crossing point is positive, the counted value is calculated by the following equation:

Counted Value = +1−(1−offset)+offset = +2×offset where "offset" means an amount of asymmetry after the decimal point.

Also, if the zero-crossing point exists between the sample signals, the value of the sample signal after the zero-crossing point is larger than the value of the sample signal before the zero-crossing point, and the sign of the sample signal after the zero-crossing point is negative, the counted value is calculated by the following equation:

$$\text{Counted Value} = -1 + \text{offset} - (1-\text{offset}) = -2 + 2 \times \text{offset}$$

where "offset" means an amount of asymmetry after the decimal point.

Also, if the zero-crossing point exists between the sample signals, the value of the sample signal after the zero-crossing point is larger than the value of the sample signal before the zero-crossing point, and the sign of the sample signal after the zero-crossing point is positive, the counted value is calculated by the following equation:

$$\text{Counted Value} = +1 - \text{offset} + (1-\text{offset}) = +2 - 2 \times \text{offset}$$

where "offset" means an amount of asymmetry after the decimal point.

In addition, if the zero-crossing point does not exist between the sample signals, and the signs of the sample signals before and after the zero-crossing point are all negative, the counted value becomes $-1$. Also, if the zero-crossing point does not exist between the sample signals, and the signs of the sample signals before and after the zero-crossing point are all positive, the counted value becomes $+1$.

In another aspect of the present invention, there is provided an apparatus for correcting an asymmetry waveform level in consideration of an asymmetric error after the decimal point, which comprises a zero-crossing detector for detecting a zero-crossing point by comparing signs of two successive sample signals; a decimal-point asymmetry detector for calculating a jitter value required for correcting the asymmetry waveform level; and a counted value decider for deciding a counted value using the zero-crossing point detected by the zero-crossing detector, the jitter value and the sign bits of the sample signals according to a system clock period.

The jitter value may be obtained by the following equation:

$$b' = b \times \text{system clock}/(a+b)$$

where, "b'" denotes the jitter value, "a" denotes a larger value out of values of sample signals before and after the zero-crossing point, and "b" denotes a smaller value out of the values of the sample signals before and after the zero-crossing point. The jitter value "b'" has a value after the decimal point, and may be an asymmetric counted value below the decimal point.

Also, if the zero-crossing point exists between the sample signals, the value of the sample signal before the zero-crossing point is larger than the value of the sample signal after the zero-crossing point, and the sign of the sample signal after the zero-crossing point is negative, the counted value is calculated by the following equation:

$$\text{Counted Value} = -1 + (1-\text{offset}) - \text{offset} = -2 \times \text{offset}$$

where "offset" means an amount of asymmetry after the decimal point.

Also, if the zero-crossing point exists between the sample signals, the value of the sample signal before the zero-crossing point is larger than the value of the sample signal after the zero-crossing point, and the sign of the sample signal after the zero-crossing point is positive, the counted value is calculated by the following equation:

$$\text{Counted Value} = +1 - (1-\text{offset}) + \text{offset} = +2 \times \text{offset}$$

where "offset" means an amount of asymmetry after the decimal point.

Also, if the zero-crossing point exists between the sample signals, the value of the sample signal after the zero-crossing point is larger than the value of the sample signal before the zero-crossing point, and the sign of the sample signal after the zero-crossing point is negative, the counted value is calculated by the following equation:

$$\text{Counted Value} = -1 + \text{offset} - (1-\text{offset}) = -2 + 2 \times \text{offset}$$

where "offset" means an amount of asymmetry after the decimal point.

Also, if the zero-crossing point exists between the sample signals, the value of the sample signal after the zero-crossing point is larger than the value of the sample signal before the zero-crossing point, and the sign of the sample signal after the zero-crossing point is positive, the counted value is calculated by the following equation:

$$\text{Counted Value} = +1 - \text{offset} + (1-\text{offset}) = +2 - 2 \times \text{offset}$$

where "offset" means an amount of asymmetry after the decimal point.

In addition, if the zero-crossing point does not exist between the sample signals, and the signs of the sample signals before and after the zero-crossing point are all negative, the counted value becomes $-1$. Also, if the zero-crossing point does not exist between the sample signals, and the signs of the sample signals before and after the zero-crossing point are all positive, the counted value becomes $+1$.

In still another aspect of the present invention, there is provided a method for correcting an asymmetry waveform level in consideration of an asymmetric error after the decimal point, which comprises the steps of a zero-crossing detector in an asymmetric counter that corrects an asymmetry signal detecting a zero-crossing point; a zero-crossing period detector in the asymmetric counter detecting a value of a period where the zero-crossing point is located; and a counted value decider in the asymmetric counter deciding a counted value through the value of the period detected by the zero-crossing period detector. The step of the zero-crossing detector detecting the zero-crossing point may detect the zero-crossing point by comparing signs of two successive sample signals. Also, the step of the zero-crossing period detector detecting the value of the period detects the value of the period where the zero-crossing point is located by dividing a system clock period by "n".

Additionally, the step of deciding the counted value divides the system clock period by "n", and if the period where the zero-crossing point is located is the "k-th" period from the sample signal before the zero-crossing point, it considers the counted value as "n+k−2" in the sample signal before the zero-crossing point and the counted value as "n−k" in the sample signal after the zero-crossing point.

In still another aspect of the present invention, there is provided an apparatus for correcting an asymmetry waveform level in consideration of an asymmetric error after the decimal point, which comprises a zero-crossing detector for detecting a zero-crossing point by comparing signs of two successive sample signals; a zero-crossing period detector for detecting a value of a period where the zero-crossing point is located; and a counted value decider for deciding a counted value through the value of the period detected by the zero-crossing period detector. The zero-crossing period detector may detect the value of the period where the zero-crossing point is located by dividing a system clock period by "n". Also, the counted value decider divides the system clock period by "n", and if the period where the zero-crossing point is located is the "k-th" period from the sample signal before the zero-crossing point, it considers the counted value as "n+k−2" in the sample signal before the zero-crossing point and the counted value as "n−k" in the sample signal after the zero-crossing point.

BRIEF DESCRIPTION OF THE DRAWINGS

The above aspects of the present invention will be more apparent by describing exemplary embodiments of the present invention with reference to the accompanying drawings, in which:

FIG. 4D is a graph explaining in detail an operation principle of a decimal-point asymmetric signal detector in an asymmetric waveform level correction apparatus according to an exemplary embodiment of the present invention;

DETAILED DESCRIPTION OF EXEMPLARY EMBODIMENTS

Figure 1:
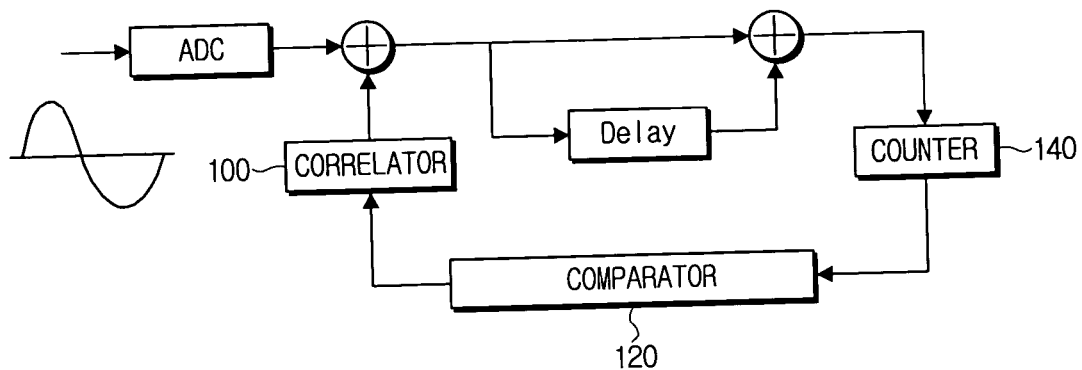
FIG. 1 is a view illustrating the construction of a circuit for detecting an asymmetric signal (e.g., DC-offset) using a digital sum value (DSV) algorithm.
Figure 2:
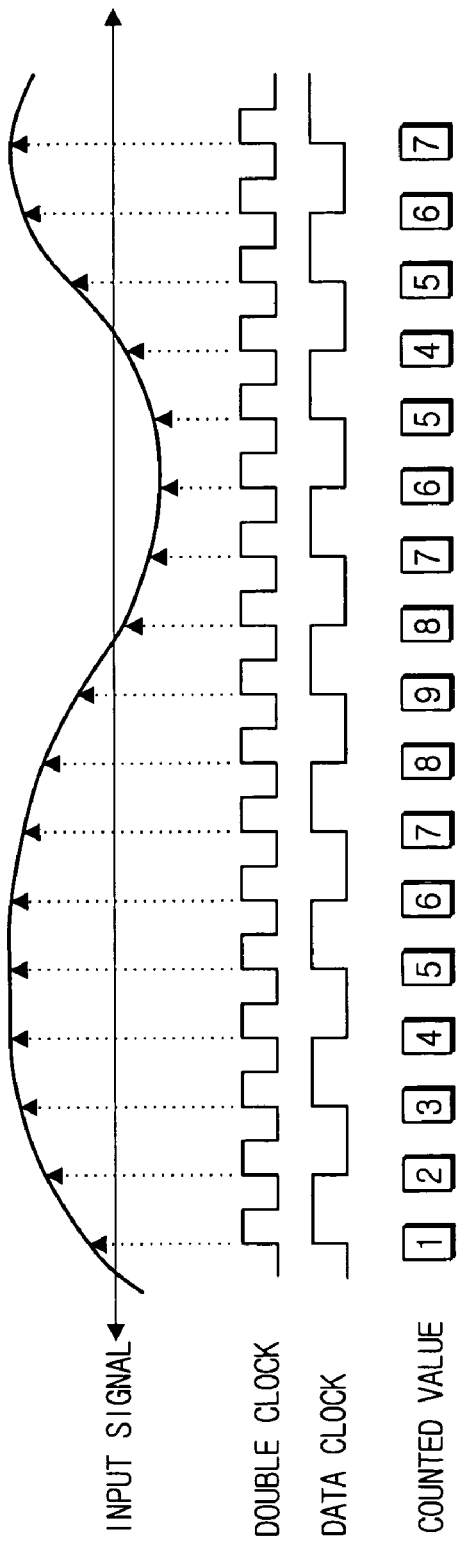
FIG. 2 is view explaining a principle of a counter operation in a DSV algorithm.

Hereafter, exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
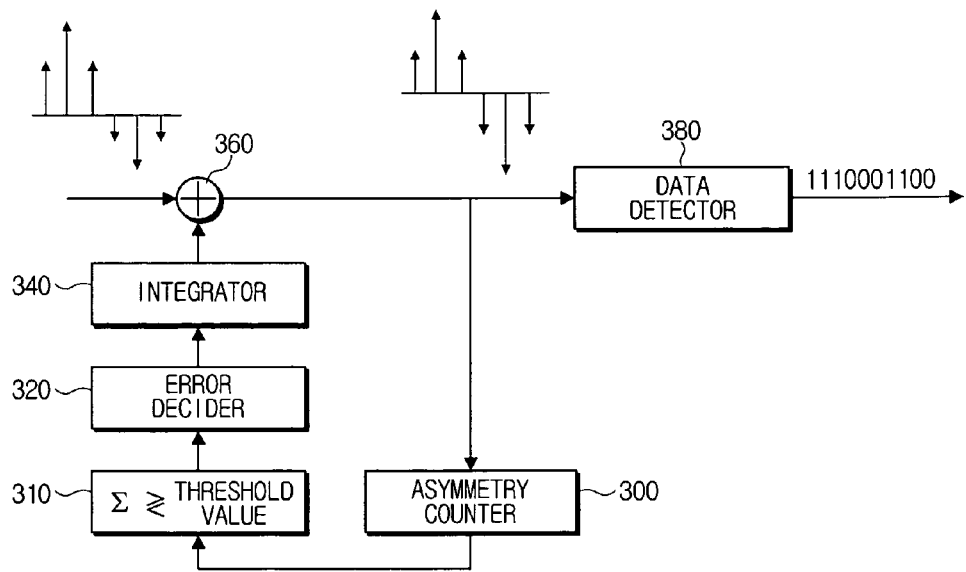
FIG. 3 is a view illustrating the construction of an asymmetric signal correction loop of an asymmetric waveform level correction apparatus in an optical disc system.

FIG. 3 is a view illustrating the construction of an asymmetric signal correction loop of an asymmetric waveform level correction apparatus in an optical disc system. As shown in FIG. 3, an asymmetric waveform level correction apparatus in an optical disc system includes an asymmetry counter 300, a comparator 310, an error decider 320, an integrator 340, a corrector 360, and a data detector 380.

First, the counted value of an A/D-converted signal according to the asymmetry of the signal is decided through the asymmetry counter 300, and the decided counted value is accumulated by the counter to generate an accumulated counted value to be lastly outputted. The comparator 310 compares the accumulated counted value with a predetermined threshold value. If the result of comparison exceeds the threshold value (i.e., optimal value in consideration of a corrected speed and a normal state value), the error decider 320 changes the sign of the above-described accumulated counted value that is the value for asymmetry correction.

Then, the integrator 340 accumulates the value in order to optimize the error-corrected value. The corrector 360 adds the optimized error correction value to a digital signal from an A/D converter, and changes the digital signal to a normal signal. As a result, the data detector 380 detects and outputs a corrected normal signal.

Figure 4A:
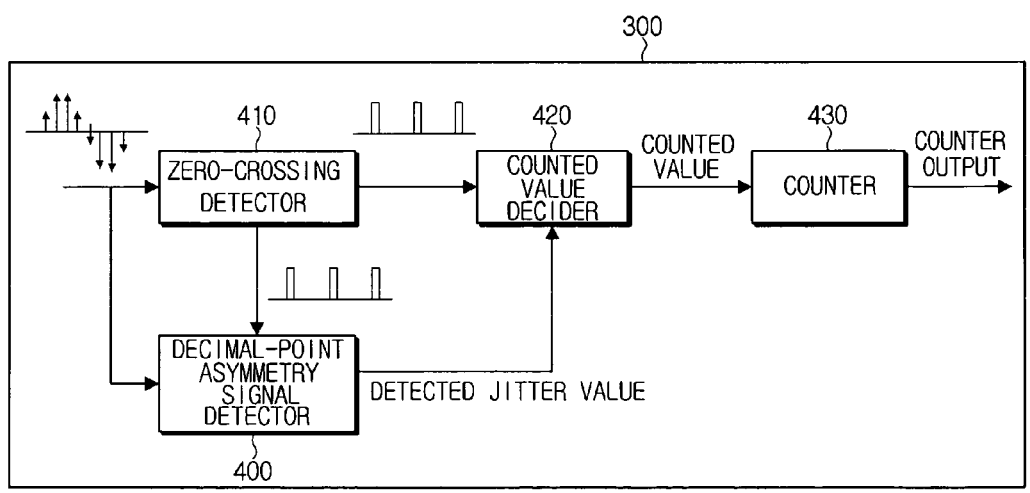
FIG. 4A is a block diagram illustrating the construction of an asymmetric waveform level correction apparatus according to an exemplary embodiment of the present invention.

FIG. 4A is a block diagram illustrating the construction of the asymmetric waveform level correction apparatus according to an exemplary embodiment of the present invention.

The asymmetry counter 300 includes a decimal-point asymmetry signal detector 400, a zero-crossing detector 410, a counted value decider 420, and a counter 430.

The zero-crossing detector 410 detects a zero-crossing time point using two sample signals among signals neighboring the zero-crossing point. The decimal-point asymmetry signal detector 400 calculates the asymmetry after the decimal point at the zero-crossing point. The counted value decider 420 decides a counted value according the conditions. The counter 430 accumulates the decided counted value.

Figure 4B:
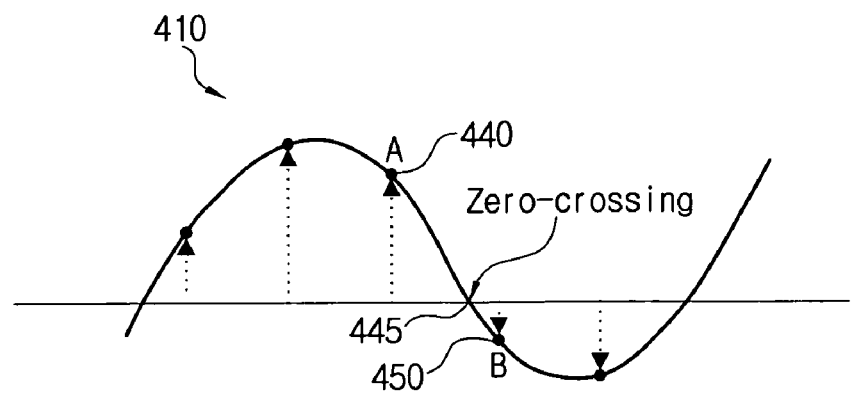
FIG. 4B is a graph explaining an operation principle of a zero-crossing detector in an asymmetric waveform level correction apparatus according to an exemplary embodiment of the present invention.

FIG. 4B is a graph explaining an operation principle of a zero-crossing detector in the asymmetric waveform level correction apparatus according to an exemplary embodiment of the present invention.

Referring to FIG. 4B, the asymmetry signal is shown. A sample 440 and a sample 450 are chosen to detect the zero-crossing point 445.

Figure 4C:
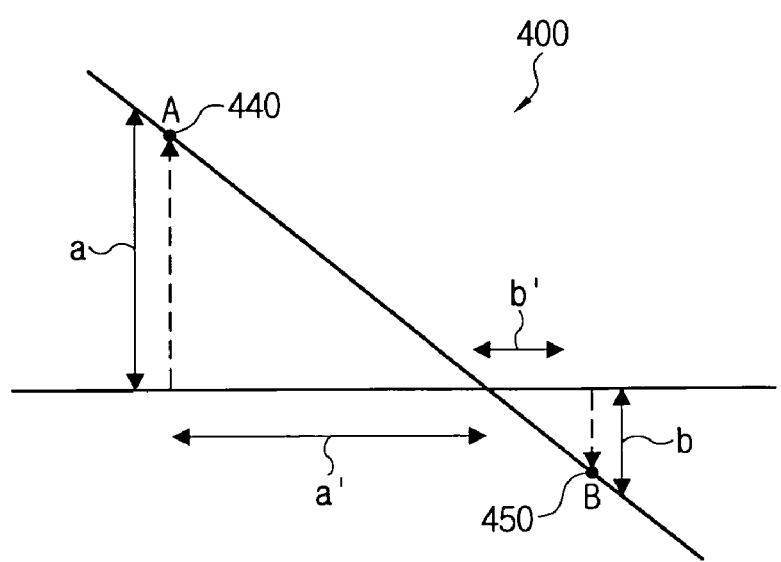
FIG. 4C is a graph explaining an operation principle of a decimal-point asymmetric signal detector in an asymmetric waveform level correction apparatus according to an exemplary embodiment of the present invention.

FIG. 4C is a graph explaining an operation principle of a decimal-point asymmetric signal detector in the asymmetric waveform level correction apparatus according to an exemplary embodiment of the present invention.

In order to design the asymmetry counter 300 in consideration of the decimal point, it is assumed that the signal values between two samples 440 and 450 are approximately linear. According to this assumption, "b'" value is decided by Equation (1) according to proportion relationship, $$a:a' = b:b', \ a'+b' = \text{System Clock}, \ b' = b \times \text{System Clock}/(a+b) \quad (1)$$

where "b'" is the jitter value, i.e., a counted value after the decimal point. The jitter value means that a smaller value out of "a'" and "b'" values is chosen. As described in Equation 1, it may define that "a" is a larger value out of sample signal values before and after the zero-crossing point, and "b" is a smaller value out of the sample signal values before and after the zero-crossing point.

FIG. 4D is a graph explaining in detail an operation principle of a decimal-point asymmetric signal detector in the asymmetric waveform level correction apparatus according to an exemplary embodiment of the present invention.

The amount of asymmetry after the decimal point is called "offset." The decimal-point asymmetry signal detector 400 will be explained in detail referring to FIG. 4D. The counted value is decided according to the three following conditions in order to implement the asymmetry counter 300 in consideration of the decimal point. Three indicators that show state conditions of the asymmetry signal will be explained by the following state equation:

$$\text{Case} = (\text{ze\_en}, \text{min\_sel}, \text{asym\_out\_d6}[5])$$

Where, ze_en becomes "1" as a value that indicates the zero-crossing point if the zero-crossing point exists, and "0" if no zero-crossing point exists. On the other hand, $\text{mim}_{\_sel\ becomes}$ "1" as a value if "b'" is the jitter value and becomes "0" if the jitter value is "a". The asym_out_d6[5] means "Down" as a value of a Maximum Sign Bit (MSB) of the signal that is synchronized and delayed with an output at the zero-crossing point, in order to decide Up/Down of the "offset", if the MSB is "1", and it means "Up", if the MSB is "0".

Case (i) shown in FIG. 4D is a case where "b'" is decided as the counted value of the asymmetry after the decimal point via the zero-crossing point. The state equation becomes case= (1, 1, 1). Lastly accumulated value of the case (i) is calculated by Equation (2).

$$-1 + (1 - \text{offset}) - \text{offset} = -2 \times \text{offset} \quad (2)$$

In the case (i), "−1" is needed to remove the accumulated value "+1" at the before clock. If a value to be updated at the before clock, i.e. "(1−offset)" is added, and "(−offset)" at a reference location is added, last accumulating value becomes "−2×offset".

Case (ii) shown in FIG. 4D is a case where "b'" is decided as the counted value of the asymmetry after the decimal point via the zero-crossing point. The state equation becomes case= (1, 1, 0). Lastly accumulated value of the case (ii) is calculated by Equation (3).

$$+1 - (1 - \text{offset}) + \text{offset} = +2 \times \text{offset} \quad (3)$$

The case (ii) is the same as the case (i) except that the sign of the signal at the reference location is positive (+). Thus, while the accumulation value of the case (i) becomes "−2× offset", the accumulation value of the case (ii) becomes "+2× offset."

Case (iii) shown in FIG. 4D is a case where "b" is decided as the counted value of the asymmetry after the decimal point via the zero-crossing point. The state equation becomes case= (1, 0, 1). Lastly accumulated value of the case (iii) is calculated by Equation (4).

$$-1 + \text{offset} - (1 - \text{offset}) = -2 + 2 \times \text{offset} \quad (4)$$

Case (iv) shown in FIG. 4D is a case where "b" is decided as the counted value of the asymmetry after the decimal point via the zero-crossing point. The state equation becomes case= (1, 0, 0). In the case (iii), "−1" is needed to remove the accumulated value "+1" at the before clock. If a value to be updated at the before clock, i.e. "offset"is added, and "−(1− offset)" at a reference location is added, final accumulating value becomes "−2+2×offset." Lastly accumulated value of the case (iv) is calculated by Equation (5).

$$+1 - \text{offset} + (1 - \text{offset}) = +2 - 2 \times \text{offset} \quad (5)$$

The case (iv) is the same as case (iii) except that the sign of the signal at the reference location is positive (+). Thus, while the accumulation value of the case (iv) becomes "+2−2× offset," the accumulation value of the case (iii) becomes "−2+ 2×offset." Except for that, a case (v) and case (vi) perform the same addition and subtraction of +1/−1 as the DSV system because the zero-crossing point is not passed. While the methods shown in FIGS. 4A, 4B, 4C and 4D decide the jitter value as the counted value after the decimal point and then accumulate the decided jitter value, a method in which the resolution is narrowed, and the counted value is different every period at the zero-crossing point, so that the value below the decimal point is reflected, will now be explained.

Figure 5A:
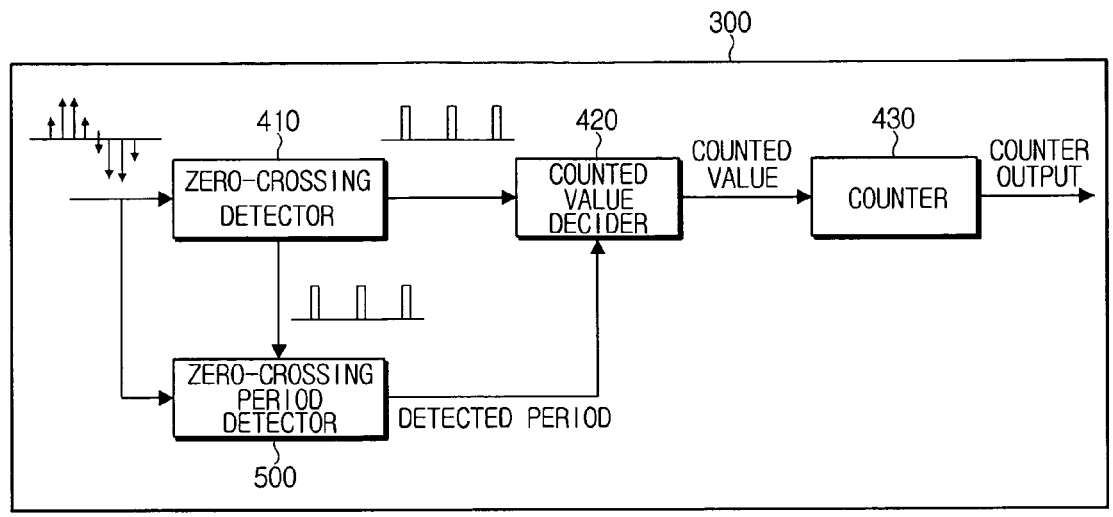
FIG. 5A is a view illustrating the construction of an asymmetric waveform level correction apparatus according to another exemplary embodiment of the present invention.

FIG. 5A is a block diagram illustrating the asymmetric waveform level correction apparatus according to another exemplary embodiment of the present invention.

The asymmetry counter 300 includes a zero-crossing period detector 500, a zero-crossing detector 410, a counted value decider 420, and a counter 430, as shown in FIG. 5A.

The zero-crossing period detector 500 estimates a period that the zero-crossing point exits, by performing an operation of a conditional equation, when the zero-crossing of the input signal occurs. The zero-crossing detector 410 detects a zero-crossing timing using two sample signals of signals approximated to the zero-crossing point. The counted value decider 420 decides the counted value according to the conditions. The counter 430 accumulates the decided counted value.

Figure 5B:
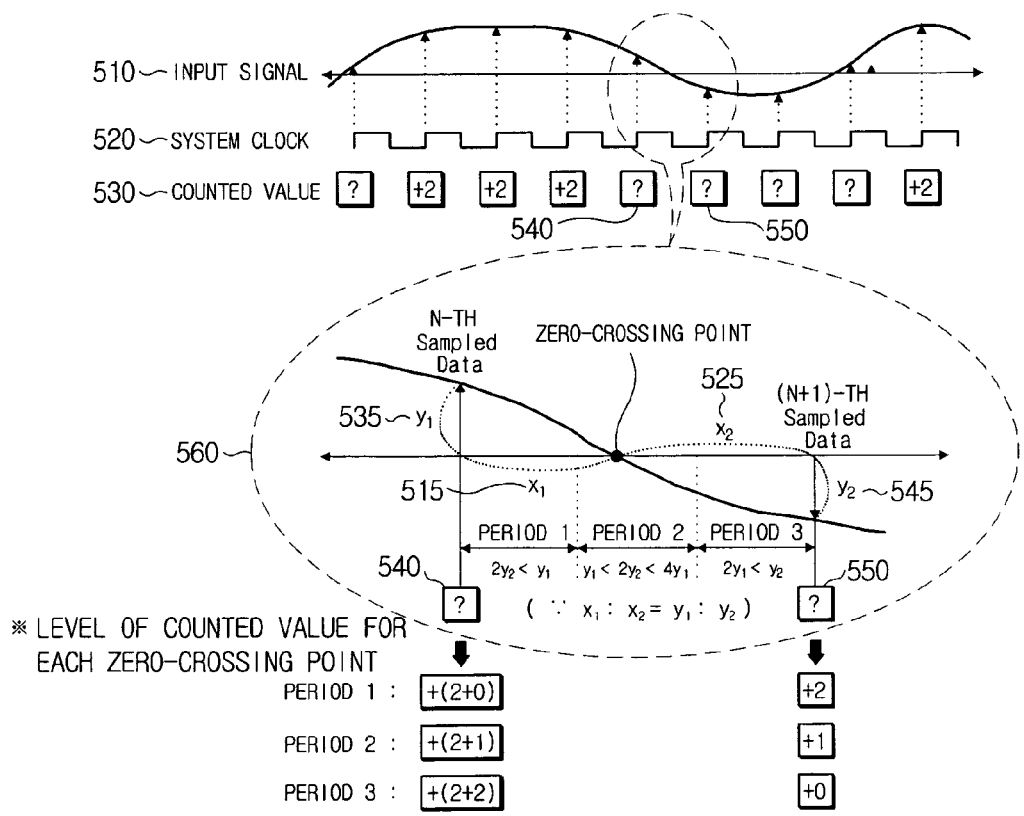
FIG. 5B is a graph explaining an asymmetric signal detection method applied to an input signal having double resolution by a zero-crossing point region detector in an asymmetric waveform level correction apparatus according to an exemplary embodiment of the present invention.

FIG. 5B is a graph explaining an asymmetric signal detection method applied to an input signal having double resolution by a zero-crossing point region detector in an asymmetric waveform level correction apparatus according to an exemplary embodiment of the present invention.

Referring to FIG. 5B, the value of the input signal 510 produced by performing the analog-to-digital conversion operation according to a system clock 520 is indicated as length of an arrow. If the resolution doubles in the period where the sign of the input signal continues to be uniform, an increasing amount of the counter 430 is set to "+2", and in the period where the sign of the input signal changes, an increasing amount of the counter 430 is changed according to the conditions. In the period for increasing the counted value of the counter 430 as shown in FIG. 5B, the changed period is indicated as "?" to express a shape that the increasing amount of the counter 430 is changed according to the conditions. A major idea of the present invention relates to an algorithm for deciding a value of the sign "?" and a method for realizing the algorithm. This can calculate the ratio of $x_1$ (515) to $x_2$ (525), because values of $y_1$ (535) and $Y_2$ (545) have already been recognized through the analog-to-digital converter. The relationship of $y_1$(535), $Y_2$(545), $x_1$(515) and $x_2$(525) can be easily obtained, since two rectangles located in the center of the zero-crossing point resemble each other. In other words, the relationship of $x_1$(515):$x_2$(525)=$y_1$(535):$y_2$(545) is satisfied.

A total area may be divided into three equal parts according to the ratio of $x_1$ (514) to $x_2$ (525). First, information informing whether the zero-crossing point is located in a certain period is obtained by the ratio of $y_1$ (535) to $y_2$ (545). Next, the increased counted value (indicated as "?") of the counter 430 is decided by the second graph 560 of FIG. 5B plotted according to the period in which the zero-crossing points are located. If the located period of the zero-crossing point is a first period from a sample signal in before the zero-crossing point, the size of the counted value at sign "?"540 on the left becomes "+2". In other words, if the number of periods is "n", and order of the period that the zero-crossing point is located is "k", the size of the counted value at sign "?"540 on the left becomes "n+k−2". At this time, the sign becomes the sign of the sample signal at the location where the size of the counting amount is decided. As shown in FIG. 5B, the sign "?"540 on the left is positive (+), and thus the counted value becomes "+2". A sum of values for a pair of signs "?" 540 and 550 is fixed to "+4", and thus the size of a value established on a sign "?" 550 on the right becomes "2", which is counted value "+2" subtracted from "+4". In other words, if the number of periods is "n", and the order of the period that the zero-crossing point is located is "k", the size of the counted value at sign "?" 550 on the right becomes "n-k". At this time, the sign becomes the sign of the sample signal at the location where the size of the counting amount is decided. As shown in FIG. 5B, the sign "?" 550 on the right is negative (-), and thus the counted value becomes "-2".

Equations (6), (7) and (8) for deciding periods are expressed by the ratio of $y_1$ (535) to $y_2$ (545) at a point that corresponds to a boundary between the periods.

Section 1: $2y_2 < y_1$ (6)

Section 2: $y_1 \leq 2y_2 \leq 4y_1$ (7)

Section 3: $2y_1 \leq y_2$ (8)

The conditional equations are produced based on the relationship as follows: $x_1$ (515):$x_2$ (525)=$y_1$ (535):$y_2$ (545)

Figure 5C:
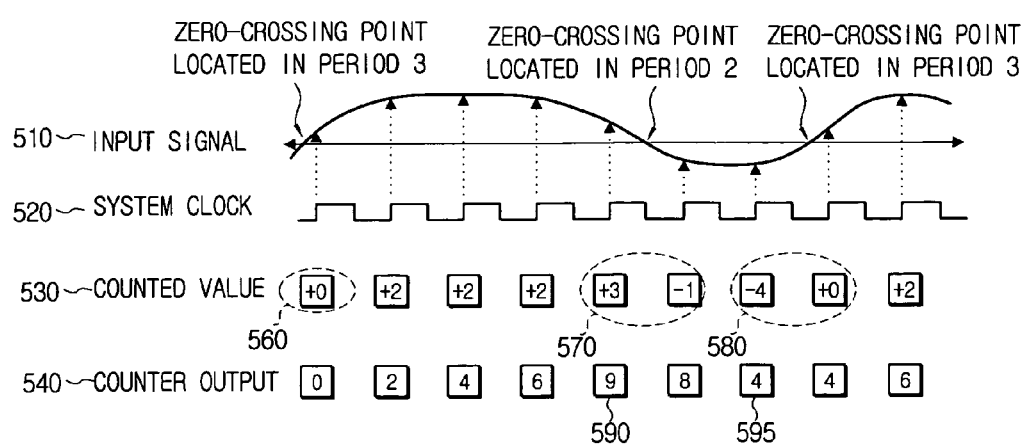
FIG. 5C is a graph explaining an operation of a zero-crossing point region detector in an asymmetric waveform level correction apparatus with respect to an input signal having double resolution according to an exemplary embodiment of the present invention.

FIG. 5C shows an operation example at an input signal having double resolution by the zero-crossing point detector in the asymmetric waveform level correction apparatus according to an exemplary embodiment of the present invention;

Referring to FIG. 5C, the period that a selected zero-crossing point is located is indicated above the input signal. At this time, we can recognize that the counted value is different according to the selected periods 560, 570, and 580. As shown in FIG. 5C, a pair of the selected counted values is indicated by a dotted line oval.

The counter 430 accumulates the selected counted value every clock. The counted value per system clock unit can be obtained by dividing the accumulated counted value by "2" since the accumulated counted value has double resolution. In other words, the accumulated counting value is "9" (590) and "4" (595), and thus divides the values "9" (590) and "4" (595) by "2". As a result, "4.5" and "2" are obtained. However, in the conventional DSV method, the counting value is "4" and "2". In view of the facts, we can recognize that exemplary embodiments of the present invention can detect the asymmetry signal with more accuracy compared to the conventional DSV method, since the counter 430 counts a value less than a point and can count in smaller increments of less than one.

Figure 6A:
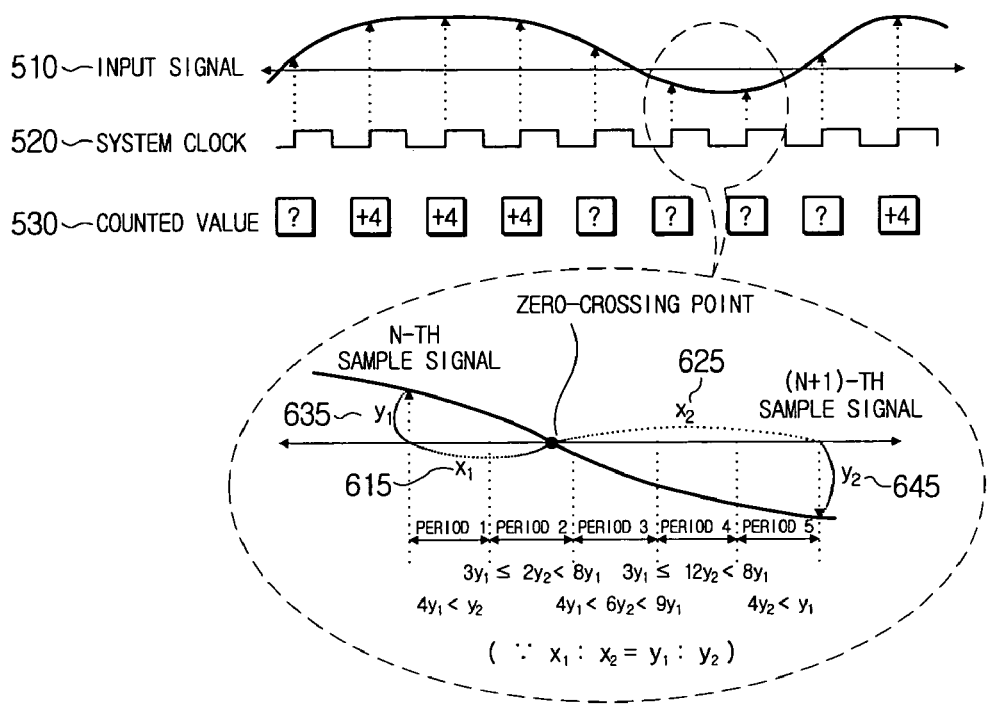
FIG. 6A is a graph explaining an asymmetric signal detection method applied to an input signal having quadruple resolution by a zero-crossing point region detector in an asymmetric waveform level correction apparatus according to an exemplary embodiment of the present invention.
Figure 6B:
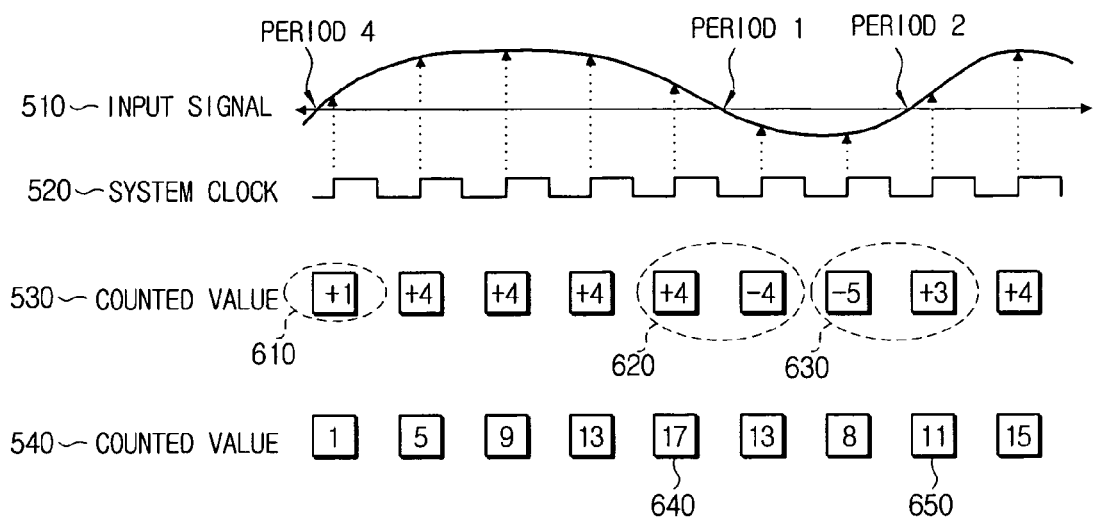
FIG. 6B is a graph explaining an operation of a zero-crossing point region detector in an asymmetric waveform level correction apparatus with respect to an input signal having quadruple resolution according to an exemplary embodiment of the present invention.

FIG. 6A is a graph explaining an asymmetric signal detection method applied to an input signal having quadruple resolution by a zero-crossing point region detector in an asymmetric waveform level correction apparatus according to exemplary embodiments of the present invention. Referring to FIG. 6A, a basic principle of the method for detecting the asymmetry signal is identical to principles of the method of FIG. 5B to accomplish four times as large a resolution. The difference is as follows:

While the period that the zero-crossing point exists is divided into three as shown in FIG. 5B, the period as shown in FIG. 6A is divided into five. In addition, while the increasing of the counted value in the counter is "+2" at the period to which the input signal is continued, as shown in FIG. 5B, the increasing of the counter output in the counter is "+4", as shown in FIG. 6B.

If the number of periods is "n", and order of the period that the zero-crossing point is located is "k", the size of the counted value at sign "?" 660 on the left become "n+k-2". Meanwhile, the size of the counted value at sign "?"670 on the right become "n-k".

Equations (9), (10), (11), (12) and (13) for deciding the period may be expressed by the ratio of $y_1$ to $y_2$ at a point that corresponds to a boundary between the periods.

Section 1: $4y_1 < y_2$ (9)

Section 2: $3y_1 \leq 2y_2 < 8y_1$ (10)

Section 3: $4y_1 \leq 6y_2 < 9y_1$ (11)

Section 4: $3y_1 \leq 12y_2 < 8y_1$ (12)

Section 5: $4y_2 \leq y_1$ (13)

The conditional equations are produced based on the relationship as follows: $x_1$ (615):$x_2$ (625)=$y_1$(635):$y_2$ (645)

FIG. 6B is an operation example at an input signal having four times as large a resolution by the zero-crossing period detector in the asymmetric waveform level correction apparatus according to exemplary embodiments of the present invention.

Referring to FIG. 6B, the period that a selected zero-crossing point is located is indicated above the input signal. At this time, we can recognize that the counted value is different according to the selected period 610, 620, and 630. A pair of the selected counted values is indicated by a dotted line oval.

The counter 430 accumulates the counting volume decided from the counted value decider 420 every clock. If the accumulated counting volume exceeds the threshold value to produce a reset signal, the counter 430 starts a counting operation as new initial value. The counted value per system clock unit can be obtained by dividing the accumulated counted value by "4" since the accumulated counting value has four times as large a resolution. In other words, the accumulated counting value is "17" (640) and "11" (650), and thus divides the values 17 and 11 by "4". As a result, "4.25" and "2.75" are obtained. However, In case of the counter in conventional DSV method, the counting value is "4" and "2". In view of the facts, we can recognize that exemplary embodiments of the present invention can detect the asymmetry signal with more accuracy compared to the conventional DSV method, since the counter 430 counts a value less than a point and can count in smaller increments of less than one.

At this time, the architecture is not related to the resolution. However, the counting volume of the comparator in the zero-crossing period detector 500 is different from that of the counted value decider 420. A period detector with higher resolution can be embodied by correcting simply the comparator and the counted value decider 420 without correcting the architecture. A logical equation of the comparator changes according to the resolution, but the resolution can be easily obtained by using the method as described above. The conventional method has drawbacks that since it is embodied by a multiplier in hardware, as shown in FIGS. 4A to 4D, its hardware area may be wide and its operation may take a long time. However, the method according to exemplary embodiments of the present invention has an advantage in that it can be embodied in hardware without the multiplier, as shown in FIGS. 5A to 6B.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for correcting, in a computing device comprising a processor having computing device-executable instructions, an asymmetry waveform level in consideration of an asymmetric error after a decimal point, the method comprising:
   correcting, using the processor, an asymmetry signal according to a detected zero-crossing point;
   calculating a jitter value required for correcting the asymmetry waveform level; and
   deciding a counted value using detected the zero-crossing point, the jitter value and sign bits of sample signals according to a system clock period.

2. The method as claimed in claim 1, wherein the detection of the zero-crossing point is accomplished by comparing signs of two successive sample signals.

3. The method as claimed in claim 1, wherein the jitter value is obtained by the following equation:

$$b'=b \times \text{system clock}/(a+b)$$

wherein "b'" denotes the jitter value, "a" denotes a larger value out of values of sample signals before and after the zero-crossing point, and "b" denotes a smaller value out of the values of the sample signals before and after the zero-crossing point.

4. The method as claimed in claim 1, wherein if the zero-crossing point exists between the sample signals, a value of a sample signal before the zero-crossing point is larger than a value of a sample signal after the zero-crossing point, and a sign of the sample signal after the zero-crossing point is negative, the counted value is calculated by the following equation:

Counted Value=−1+(1−offset)−offset=−2×offset wherein the "offset" is an amount of asymmetry after the decimal point.

5. The method as claimed in claim 1, wherein if the zero-crossing point exists between the sample signals, a value of a sample signal before the zero-crossing point is larger than a value of a sample signal after the zero-crossing point, and a sign of the sample signal after the zero-crossing point is positive, the counted value is calculated by the following equation:

Counted Value =+1−(1−offset)+offset=+2×offset wherein the "offset" is an amount of asymmetry after the decimal point.

6. The method as claimed in claim 1, wherein if the zero-crossing point exists between the sample signals, a value of a sample signal after the zero-crossing point is larger than a value of a sample signal before the zero-crossing point, and a sign of the sample signal after the zero-crossing point is negative, the counted value is calculated by the following equation:

Counted Value=−1+offset−(1−offset)=−2+2×offset wherein the "offset" is an amount of asymmetry after the decimal point.

7. The method as claimed in claim 1, wherein if the zero-crossing point exists between the sample signals, a value of a sample signal after the zero-crossing point is larger than a value of a sample signal before the zero-crossing point, and a sign of the sample signal after the zero-crossing point is positive, the counted value is calculated by the following equation:

Counted Value=+1−offset+(1−offset)=+2−2×offset wherein the "offset" is an amount of asymmetry after the decimal point.

8. The method as claimed in claim 1, wherein if the zero-crossing point does not exist between the sample signals, and signs of sample signals before and after the zero-crossing point are all negative, the counted value becomes "−1".

9. The method as claimed in claim 1, wherein if the zero-crossing point does not exist between the sample signals, and signs of sample signals before and after the zero-crossing point are all positive, the counted value becomes "+1".

10. An apparatus for correcting an asymmetry waveform level in consideration of an asymmetric error after a decimal point, the apparatus comprising:
   a zero-crossing detector which detects a zero-crossing point by comparing signs of two successive sample signals;
   a decimal-point asymmetry detector which calculates a jitter value required for correcting the asymmetry waveform level; and
   a counted value decider which decides a counted value using the zero-crossing point detected by the zero-crossing detector, the jitter value and sign bits of the sample signals according to a system clock period.

11. The apparatus as claimed in claim 10, wherein the jitter value is obtained by the following equation:

$$b'=b \times \text{system clock}/(a+b)$$

wherein "b'" denotes the jitter value, "a" denotes a larger value out of values of sample signals before and after the zero-crossing point, and "b" denotes a smaller value out of the values of the sample signals before and after the zero-crossing point.

12. The apparatus as claimed in claim 10, wherein if the zero-crossing point exists between the sample signals, a value of a sample signal before the zero-crossing point is larger than a value of a sample signal after the zero-crossing point, and a sign of the sample signal after the zero-crossing point is negative, the counted value is calculated by the following equation:

Counted Value=−1+(1−offset)−offset=−2×offset wherein the "offset" is an amount of asymmetry after the decimal point.

13. The apparatus as claimed in claim 10, wherein if the zero-crossing point exists between the sample signals, a value of a sample signal before the zero-crossing point is larger than a value of a sample signal after the zero-crossing point, and a sign of the sample signal after the zero-crossing point is positive, the counted value is calculated by the following equation:

Counted Value=+1−(1−offset)+offset=+2×offset wherein the "offset" is an amount of asymmetry after the decimal point.

14. The apparatus as claimed in claim 10, wherein if the zero-crossing point exists between the sample signals, a value of a sample signal after the zero-crossing point is larger than a value of a sample signal before the zero-crossing point, and a sign of the sample signal after the zero-crossing point is negative, the counted value is calculated by the following equation:

Counted Value=−1+offset−(1−offset)=−2+2×offset wherein the "offset" is an amount of asymmetry after the decimal point.

15. The apparatus as claimed in claim 10, wherein if the zero-crossing point exists between the sample signals, a value of a sample signal after the zero-crossing point is larger than a value of a sample signal before the zero-crossing point, and a sign of the sample signal after the zero-crossing point is positive, the counted value is calculated by the following equation:

Counted Value=+1−offset+(1−offset)=+2−2×offset wherein the "offset" is an amount of asymmetry after the decimal point.

16. The apparatus as claimed in claim 10, wherein if the zero-crossing point does not exist between the sample signals, and signs of sample signals before and after the zero-crossing point are all negative, the counted value becomes "−1".

17. The apparatus as claimed in claim 10, wherein if the zero-crossing point does not exist between the sample signals, and signs of sample signals before and after the zero-crossing point are all positive, the counted value becomes "+1".

18. A method for correcting, in a computing device comprising a processor having computing device-executable instructions, an asymmetry waveform level in consideration of an asymmetric error after the decimal point, the method comprising:

correcting, using the processor, an asymmetry signal according to a detected zero-crossing point;

detecting a value of a period where the zero-crossing point is located; and deciding a counted value using the detected value of the period.

19. The method as claimed in claim 18, wherein the zero-crossing point is detected by comparing signs of two successive sample signals.

20. The method as claimed in claim 18, wherein detection of the value of the period where the zero-crossing point is located is accomplished by dividing a system clock period by "n", wherein "n" is a number of periods from a sample signal.

21. The method as claimed in claim 18, wherein the deciding the counted value is accomplished by dividing a system clock period by "n", and if a period where the zero-crossing point is located is the "k-th" period from a sample signal before the zero-crossing point, the counted value is considered as "n+k−2" in the sample signal before the zero-crossing point and the counted value is considered as "n−k" in a sample signal after the zero-crossing point, wherein "n" is a number of periods from a sample signal and "k" is a predetermined number.

22. An apparatus for correcting an asymmetry waveform level in consideration of an asymmetric error after the decimal point, the apparatus comprising:

a zero-crossing detector which detects a zero-crossing point by comparing signs of two successive sample signals;

a zero-crossing period detector which detects a value of a period where the zero-crossing point is located; and a counted value decider which decides a counted value using the value of the period detected by the zero-crossing period detector.

23. The apparatus as claimed in claim 22, wherein the zero-crossing period detector detects the value of the period where the zero-crossing point is located by dividing a system clock period by "n", wherein "n" is a number of periods from one of the sample signals.

24. The apparatus as claimed in claim 22, wherein the counted value decider divides a system clock period by "n", and if a period where the zero-crossing point is located is the "k-th" period from a sample signal before the zero-crossing point, the counted value decider considers the counted value as "n+k−2" in the sample signal before the zero-crossing point and the counted value as "n−k" in a sample signal after the zero-crossing point, wherein "n" is a number of periods from one of the sample signals and "k" is a predetermined number.

* * * * *